Figure 1A:
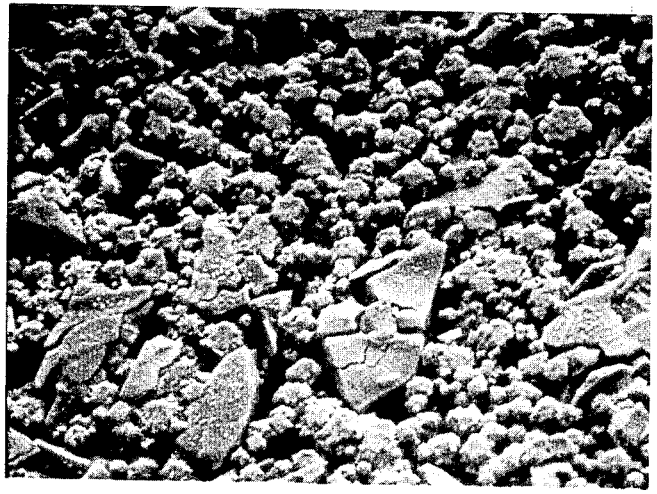

United States Patent [19]

Shepard, Jr. et al.

[11] Patent Number: 4,737,249

[45] Date of Patent: Apr. 12, 1988

[54] ELECTROLYTIC PRODUCTION OF HYDROGEN

[75] Inventors: Vance R. Shepard, Jr., Suffern; Dale E. Hall; John T. Arms, both of Monroe; William D. K. Clark, Warwick, all of N.Y.

[73] Assignee: Inco Alloys International, Inc., Huntington, W. Va.

[21] Appl. No.: 828,515

[22] Filed: Feb. 12, 1986

Related U.S. Application Data

[63] Continuation of Ser. No. 357,986, Mar. 15, 1982, abandoned.

[51] Int. Cl.$^4$ .............................................. C25B 1/02
[52] U.S. Cl. ...................................... 204/129; 204/293
[58] Field of Search ................... 204/129, 293, 290 R, 204/291, 294

[56] References Cited

U.S. PATENT DOCUMENTS

| | | | |
|---|---|---|---|
| 3,645,796 | 2/1972 | Bohm et al. | 204/290 R X |
| 3,669,745 | 6/1972 | Beccu | 429/218 X |
| 3,793,435 | 2/1974 | Wiswall et al. | 423/248 |
| 3,825,418 | 7/1974 | Wiswall et al. | 75/159 |
| 3,881,960 | 5/1975 | Haschka et al. | 429/101 |
| 4,080,278 | 3/1978 | Ravier et al. | 204/293 X |
| 4,142,300 | 3/1979 | Dwight et al. | 34/15 |
| 4,152,145 | 5/1979 | Sandrock | 75/122 |
| 4,161,401 | 7/1979 | Sandrock | 75/170 |
| 4,161,402 | 7/1979 | Sandrock | 75/170 |
| 4,222,770 | 9/1980 | Minou et al. | 75/122 |
| 4,242,315 | 12/1980 | Bruining et al. | 423/252 |
| 4,249,940 | 2/1981 | Keresztes et al. | 75/122 |
| 4,299,682 | 11/1981 | Oda et al. | 204/290 R |

OTHER PUBLICATIONS

Kitamura et al., "Embrittlement . . . of H$_2$", Electrochimica Acta, vol. 27, No. 12, pp. 1723-1727.
Kitamura et al., "Comparative Study . . . Cyclic Voltametry", Electrochimica Acta, vol. 27, No. 12, pp. 1729-1731 (1982).
A. Brenner, "Electrodeposition . . . Practice", Academic Press, vol. 2, 1963, pp. 185-189.
M. van Rijswick, "Metal . . . Storage", Philips Res. Lab., pp. 261-271 (1978).
M. Miles, "Evaluation . . . in Alkaline Sol.", Elect. Chem. & Int. Electrochem., vol. 60, 1975, pp. 89-96.
Tohru et al., "Hydrogen . . . in Alkaline Sol.", Chem. Lett., 1981, (7), pp. 965-966.

Primary Examiner—John F. Niebling
Assistant Examiner—Nam X. Nguyen
Attorney, Agent, or Firm—Raymond J. Kenny; Francis J. Mulligan, Jr.

[57] ABSTRACT

A process for the electrochemical production of hydrogen from an aqueous alkaline electrolyte characterized by the use as a cathode of a material having the general formula AB$_5$H$_x$ wherein A is one or more of rare earth metals and calcium, B is nickel or cobalt and x is a number, generally from 4 to 8 characteristic of saturation of the AB$_5$-compound with hydrogen. The hydrogen is generated at a relatively low overpotential and thus at high efficiency.

15 Claims, 3 Drawing Sheets

ELECTROLYTIC PRODUCTION OF HYDROGEN

This application is a continuation of application Ser. No. 357,986 filed Mar. 15, 1982 now abandoned.

TECHNICAL FIELD

This invention relates to the electrolytic production of hydrogen, in general, and, more particularly to hydrogen production by the electrolysis of aqueous alkaline and alkaline chloride solutions.

BACKGROUND OF THE ART

It is well known that passage of direct current between an anode and a cathode in an aqueous solution of an electrolyte containing no ions more readily electrodepositable than hydrogen will result in the production of gaseous hydrogen at the cathode. Industrially, hydrogen is produced by electrolysis of alkaline solutions such as aqueous solutions of potassium hydroxide, sodium hydroxide, alkaline sodium chloride and the like. One of the main features of such electrolyses which determines to a great part the efficiency of the electrolysis process is the selection of electrode materials, both anode and cathode, to provide in a practical manner the lowest overpotential for the electrochemical processes occurring at those electrodes. The present invention is concerned with the cathodic process of releasing gaseous hydrogen at the cathode. In the past it has been conventional to use iron, nickel, cobalt or alloys of these metals as cathodes because, in physical forms available for cathode structures, these metals are capable of giving overpotentials as low as about 300 mV when operated at commercially useful cathode current densities of about 200 mA/cm$^2$. While other group VIII metals, notably platinum, are capable of exhibiting much lower overpotentials for release of hydrogen, precious metals of the group VIII class are too expensive for use in normal commercial installations.

SUMMARY OF THE INVENTION

In accordance with the present invention, there is provided an electrolytic process of producing hydrogen from an aqueous alkaline electrolyte preferably held at a temperature above about 60° C. wherein the cathode contains as the essential cathode active material, a hydrided alloy having the structure of an intermetallic compound of the formula AB$_5$ wherein A is a rare earth metal, a mixture of rare earth metals, calcium or one or more rare earth metals and calcium and B is principally nickel or cobalt.

DRAWINGS

Figure 1B:
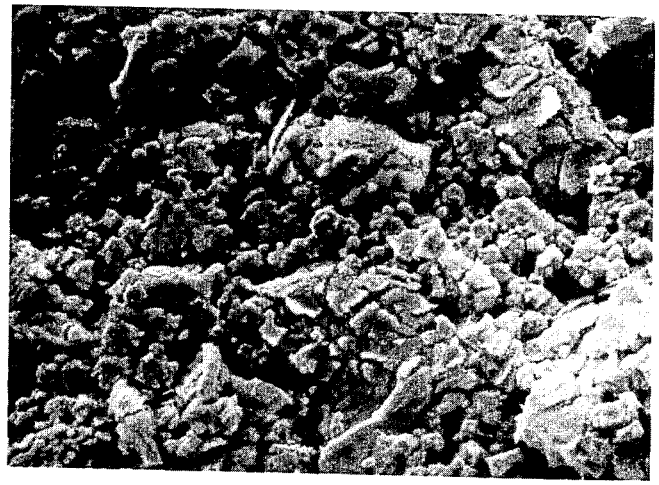
Figure 2A:
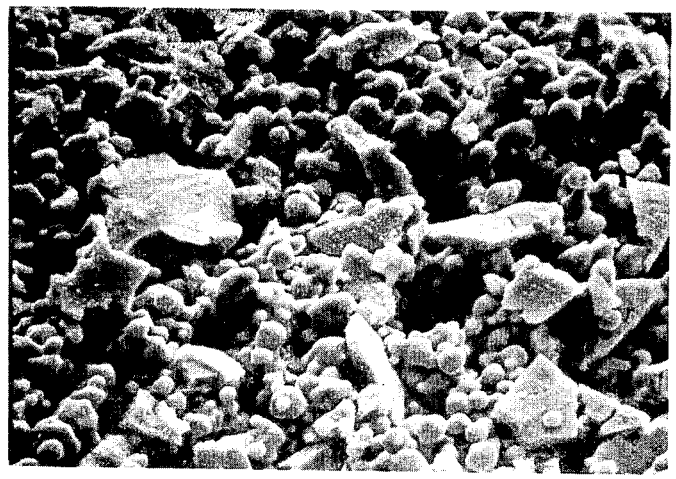
Figure 2B:
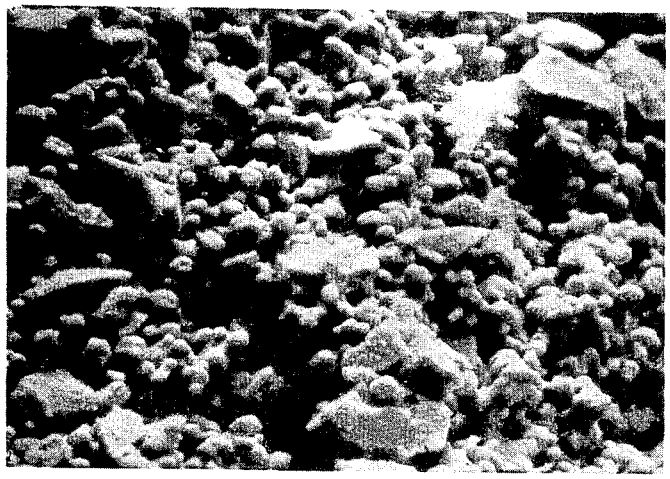
Figure 3A:
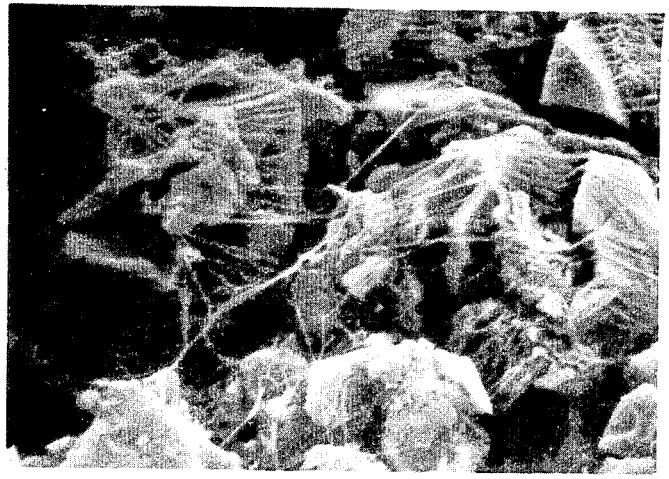
Figure 3B:
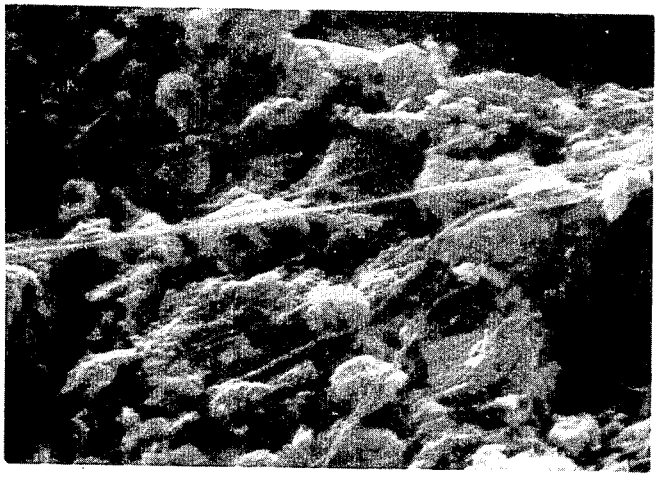

Cathodes used in the process of the present invention are illustrated in photomicrographs in the drawing in which;

FIGS. 1A and 1B depict at 1000 power a pressed and sintered mixture of 50% nickel 123 powder and 50% LaNi$_{4.7}$Al$_{0.3}$ prior to electrolysis and after 24 hours of electrolysis, respectively;

FIGS. 2A and 2B depict at 1000 power a similar sintered mixture as in FIGS. 1A and 1B except that a polysilicate binder was employed, FIG. 2A showing material prior to electrolysis and FIG. 2B showing cathode material after about 170 hours of electrolysis; and FIGS. 3A and 3B depict at 3000 power a plastic bonded electrode prior to electrolysis and after 6 hours of electrolysis, respectively.

GENERAL DESCRIPTION OF THE CATHODE

As stated hereinbefore, the cathode used in the process of the present invention contains as the essential cathode active material, a hydrided alloy having the structure of an intermetallic compound of the formula AB$_5$. Materials responding to the definition of AB$_5$ are known to form compounds with hydrogen (see U.S. Pat. Nos. 4,161,401; 4,161,402; 4,152,145; 4,222,770; 4,242,315; 4,249,940; 3,793,435; 3,825,418; 4,142,300.) The hydrogen compounds are, in fact, those materials which are actually present in the cathode when hydrogen is evolving. For example, a cathode made with LaNi$_5$ will actually contain LaNi$_5$H$_x$, where x is a number between perhaps 4 and 8, during hydrogen evolution from such a cathode. It is also known that hydrogen storage materials such as LaNi$_5$ can be used as electrodes in secondary batteries (see U.S. Pat. Nos. 3,520,728; 3,669,745; 3,874,928; 3,881,960; 3,980,501; 4,004,943; 4,025,412; 4,048,407; 4,107,395.) However, as far as applicants are aware, it has not been the intent with these batteries that hydrogen be evolved and collected from the battery electrodes nor, as far as applicants are aware, the art has not disclosed any advantage for release of hydrogen from such hydride electrodes.

As those skilled in the metallurgical art will appreciate, an intermetallic structure such as AB$_5$ will persist at chemistries significantly varying from the exact AB$_5$ stoichiometry. In this regard reference is made to the La/Ni phase diagram which shows LaNi$_5$ existing in association with La$_2$Ni$_{17}$ from about 78 to about 83 atomic percent (A/o) nickel and in association with nickel at atomic percentages of nickel higher then about 83.5 and approaching 100 A/o nickel. (See Journal of the Less Common Metals, Vol. 29 (1972) p. 203 at 206.) Thus, for purposes of the present invention, cathodes useful in the hydrogen production process can vary in composition from about AB$_4$ to AB$_8$ or even wider so long as the cathode as made contains a significant amount for example at least about 30% by weight of the AB$_5$ hydridable structure.

With respect to the component A of the AB$_5$ structure, other metals such as zirconium and thorium individually or in combination can substitute on an atom-for-atom basis for up to about 20 A/o of rare earth metal. With respect to the B component metals such as aluminum, copper, tin, iron, and chromium can substitute on an atom-for-atom basis individually or in combination for up to about 1.5 of the 5 atoms of nickel or cobalt in the AB$_5$ compound. Cobalt and nickel are equivalents for purpose of the invention. However, cobalt-rich compounds such as SmCo$_5$ are not ordinarily used because of cost.

Rare earths used in the AB$_5$ compound employed in preparing cathodes for use in the process of the present invention are conveniently in the form of relatively inexpensive mixtures such as mischmetal (M) or cerium-free mischmetal (CFM). Compositions in weight percent, of commonly available grades of these mixtures are set forth in Table I.

TABLE I

| Element | M* | CFM* |
| --- | --- | --- |
| Ce | 48–50 | about 0.8 |
| La | 32–34 | about 61.6 |

TABLE I-continued

| Element | M* | CFM* |
|---|---|---|
| Pr | 4–5 | about 9.2 |
| Nd | 13–14 | about 28.5 |

*Moly Corp

In making cathodes for use in the process of the present invention, the $AB_5$ material is generally reduced to a fine powder (α5 μm to 20 μm in particle size) by subjecting $AB_5$ metal granules to one or more hydriding-dehydriding cycles. As is well known in the metal hydride art (see for example Philips Res. Reports 25, 133–140, 1970) rare earth-nickel $AB_5$ compounds will absorb large amounts of hydrogen at any given temperature over the operating range of the specific compound provided hydrogen is present at a minimum pressure known as the "plateau pressure". Initial hydriding may require significantly higher hydrogen pressures than the "plateau pressure" to initiate pickup of hydrogen. Once hydriding starts, metal granules of $AB_5$ tend to increase somewhat in volume due to hydrogen absorption and become microcracked. If dehydriding follows the hydriding (carried out by lowering the hydriding pressure below the "plateau pressure") a second and subsequent hydriding operation will occur at or around the "plateau pressure" and the original granular metal structure will be replaced through continuous microcracking by the fine powder metal form mentioned hereinbefore. The fine powder can then be bonded together in any convenient way, for example, by plastic bonding or by metallurgical bonding to form the cathode structure per se or to be bonded on a cathode substrate.

Cathodes useful in the process of the present invention can be made by plastic bonding finely powdered $AB_5$ alloy. The $AB_5$ powder is blended with shear along with finely divided polytetrafluorethylene (PTFE), carbon black, a thermoplastic water-soluble resin and a support polymer such as polyethylene, other polyolefin, aromatic polymer such as polystyrene, or a halogen substituted thermoplastic polymer such as polyvinyl chloride. The blended material is then formed into an electrode shape, with or without, a metallic current distributor, and then leached in water to remove the water-soluble resin. In forming the plastic bonded electrode around a metallic current distributor one can employ any conventional technique employed for plastic coating of metal. For example, one can grind the compounded material containing water-soluble resin to a fine powder and coat the metal current distributor by slurry or electrostatic means. In these cases after any carrier is volatilized, the fine particles are subjected to a heating operation on the metallic support to melt the resins and form a consolidated coating. Alternatively, the fine particles of compounded material can be fluidized, the metal support can be heated and the heated support dipped into the fluidized plastic compounded material. Upon contact the plastic bonded particles will melt and adhere to the metal substrate. In each case, after coating has taken place and the coating is consolidated by the heating operation, the water-soluble resin is leached from the compounded material.

Typical mixtures in percent by weight, for forming plastic bonded cathodes are set forth in Table II

TABLE II

| Component | Range, wt. % | Optimum, wt. % |
|---|---|---|
| PTFE | 1–4 | 1–2 |
| Polyethylene* | 0–4 | 0–2 |
| Carbon black | 1–5 | 2–3 |
| Water-soluble resin (e.g., polyethylene oxide**) | 7–15 | 8–10 |
| Electrocatalyst powder | Bal | Bal |

*or other polyolefin, aromatic polymer, or halogen-substituted polymer.
**polyvinyl alcohol, polyacrylic acid, sulfonated polystyrene and N, polyvinyl pyrrolidone can also be used.

It is to be observed that although water-soluble resins are employed in compositions in Table II, such resins can be replaced by other resins which can be selectively dissolved away from the polyethylene. For example, natural shellac, soluble in ethanol, could be used as a selectively soluble resin with polyethylene. When formulating a composition within the ranges set forth in Table II, one should take care to provide sufficient shear inducing mechanical work so as to fibrillate the PTFE. The carbon black employed is advantageously an electroconductive grade such as Ketjen TM black sold by Akzona, Inc. or Shawinigan TM black sold by Shawinigan Corp. In blending these electroconductive grades of carbon black into the cathode mixture, care should be taken to avoid that amount of mechanical work which will break down the fibrous structure of such blacks so as to destroy their conductive character.

More specifically, the polymer-$AB_5$ mixtures as set forth in Table II are formulated such that the total polymer content of the mixture is approximately 8–15 weight percent. At higher polymer contents, there is a reduction in electrical conductivity of the finished electrode; with less polymer, the mixture does not blend and flow properly, and subsequent pressing is adversely affected.

The mix is ground for about one hour in a motorized mortar and pestle to fibrillate the PTFE. This is essential for producing an electrode structure with adequate mechanical strength. The mixture is then worked at about 120° C. under pressures of up to $4.6 \times 10^6$ Pa until a homogeneous mixture in sheet form results.

Electrode blanks are cut from the sheets. These are laminated with nickel screen by pressing at $2.23 \times 10^7$ Pa at a temperature of 120° C. The nickel screen imparts strength to the finished electrode and also serves as a current collector. Other foraminous nickel or steel materials can be used in place of the nickel screen.

The water-soluble polymer is leached from the cathode by soaking in water for about 24 hours. The cathode is then dried and pressed between two fine metal screens at $7.66 \times 10^5$—$1.53 \times 10^6$ Pa. This final pressing is carried out at 120° C. if the electrode contains both PTFE and polyethylene; when no polyethylene or equivalent thermoplastic material is used, pressing is carried out at 177° C.

In some instances, electrodes can be improved by being preconditioned electrolytically. To do this, the cathodes are charged, i.e., hydrogen is generated and incorporated into the electrocatalyst. This produces $AB_5H_y$, where y is most probably a number in the range of 6–7. The cathodes are then discharged, i.e., the hydrogen in the electrocatalyst is released and electrochemically oxidized to water at the cathode surface. This preconditioning sometimes results in lower hydrogen evolution overpotentials during subsequent operation. In the bulk of instances however, no advantage is seen in electrolytic preconditioning.

Cathode structures useful in the process of the present invention can also be made by metallurgical bonding using about 30% to about 70% by weight of finely powdered AB$_5$ alloy made as described hereinbefore with the balance being bonding metal resistant to an aqueous chlor-alkali or alkali electrolyte. For most practical purposes, the bonding metal will be finely powdered iron or nickel or alloys or mixtures of these metals alone or with cobalt. In certain instances, one might use platinum group metals or chromium alone or along with powdered iron or nickel. However, because of the expense of these materials and difficulty in sintering chromium, it is not likely that significant use of these metals will occur. Except for minor alloying quantities used in iron or nickel bonding materials, one should avoid metals such as copper, aluminum, zinc and tin for metallurgical bonding of AB$_5$ cathode material.

When iron, nickel and iron-nickel alloys and mixtures are used as the bonding metal, the mixed AB$_5$-bonding metal material, along with or without aqueous silica sol binder, is subjected (after binder drying and/or pressing, if necessary) to a sintering operation which conveniently is carried out in a protective atmosphere, e.g. hydrogen, cracked ammonia or inert gas, at temperature/time conditions varying from about 1 hour at 760° C. to about 5 to about 10 minutes at 900° C. Sintering temperatures above about 950° C. should be avoided. Generally, it has been observed that sintering for the shortest time at the lowest practical temperature is most advantageous. Excellent results have been obtained by sintering at 800° for about 10 minutes in a hydrogen or cracked ammonia atmosphere. While these conditions have been established for bonding with fine, nickel powder (nickel powder grade 123 Inco Ltd.) and may vary somewhat when using iron or iron-nickel alloys or mixtures, the basic criterion of a satisfactory sintering operation is a relatively strong particle-to-particle bond while retaining the identity of the AB$_5$ material. Sintering should not be carried out for such times and at such temperatures that excessive diffusion of nickel or ion into the AB$_5$ structure occurs. Those skilled in the art will readily appreciate the strength-composition balance which must be retained and will be able, with minor amount of testing, to determine optimum sintering conditions for any AB$_5$-bonding metal composition.

PREFERRED MODES FOR CARRYING OUT THE INVENTION

Cathodes constructed as set forth and described in the following examples were each employed in a process in accordance with the present invention. In this process, hydrogen was electrolytically evolved at and collected from a cathode surface in an aqueous alkaline electrolyte containing 30% by weight of KOH maintained at a temperature of 80° C. Nickel was employed as the anode and the cathode current density was uniformly 200 mA/cm$^2$ based upon the gross, apparent surface area of the cathode. Results were obtained in terms of overpotential ($\eta$) based upon measurement of potential difference between the active, hydrogen evolving cathode and a saturated calomel or mercury/mercuric oxide reference electrode and computer correction of the observed data to account for resistive effects in the measuring circuit.

EXAMPLE 1

A plastic bonded hydrogen evolution cathode was prepared from a blend of the following ingredients.

| Component | Grade and Particle Size | Wt. % |
| --- | --- | --- |
| LaNi$_{4.7}$Al$_{0.3}$ | Ergenics Div. MPD Corp (−325 mesh) | 86 |
| PTFE | DuPont Teflon ™ resin grade 7A (35 μm) | 1 |
| Polyethylene | U.S.I. Chemical FN 500 (20 μm) | 2 |
| Carbon black | Ketjen ™ Black | 3 |
| Polyethylene oxide | Union Carbide WSRN ™ 750 | 8 |

The blend was ground for about one hour in a motorized mortar and pestle to fibrillate the PTFE. This is essential for producing an electrode structure with adequate mechanical strength. The mixture was then worked at about 120° C. under pressures of up to 4.6×10$^6$ Pa until a homogeneous mixture in sheet form resulted.

Electrode blanks were cut from the sheets. These were laminated with nickel screen by pressing at 2.23×10$^7$ Pa at a temperature of 120° C. The nickel screen imparts strength to the finished electrode and also serves as a current collector. Other foraminous nickel or steel materials can be used in place of the nickel screen.

The water-soluble polymer was leached from the cathode by soaking in water for about 24 hours. The cathode was then dried and pressed between two fine metal screens at 7.66×10$^5$—1.53×10$^6$ Pa. This final pressing was carried out at 120° C. After preconditioning, the cathode was used to evolve hydrogen in 30 w/o KOH (aqueous) electrolyte at 80° C. The cathode current density was 200 mA/cm$^2$. After 6 hours of continuous electrolysis, a cathode overpotential of 95 mV was measured. This measured value contained a small potential component due to uncompensated resistance losses in the measuring circuit.

EXAMPLE 2

Using the procedure described in Example 1, a hydrogen evolution cathode was made from the following mixture:

| Component | Grade and Particle Size | Wt. % |
| --- | --- | --- |
| LaNi$_{4.7}$Al$_{0.3}$ | Ergenics Div. MPD Corp. (−325 mesh) | 86 |
| PTFE | DuPont Teflon ™ resin grade 7A (35 μm) | 2 |
| Polyethylene oxide | Union Carbide WSRN ™ 750 | 10 |
| Carbon black | Ketjen ™ Black | 2 |

Final pressing was at 177° C. at a pressure of 7.66×10$^5$ Pa. After preconditioning, the cathode was used to evolve hydrogen as in Example 1. After 6 hours of continuous electrolysis, a cathode overpotential of 132 mV at 200 mA/cm$^2$ was measured. The measured value included a potential component due to resistance losses in the measuring circuit.

EXAMPLE 3

Using the procedure described in Example 1, a hydrogen evolution cathode was made from the following mixture:

| Component | Grade and Particle Size | Wt. % |
|---|---|---|
| $LaNi_{4.7}Al_{0.3}$ | Ergenics Div. MPD Corp. (−325 mesh) | 86 |
| PTFE | DuPont Teflon TM resin grade 7A (35 μm) | 1 |
| Polyethylene | U.S.I. Chemical FN 500 (20 μm) | 2 |
| Carbon black | Ketjen TM Black | 3 |
| Polyethylene oxide | Union Carbide WSRN TM 750 | 8 |

Final pressing was at 120° C. at a pressure of $1.15 \times 10^6$ Pa. The cathode was used without preconditioning to evolve hydrogen in 30 w/o KOH (aqueous) electrolyte at 80° C.; the cathode current density was 200 mA/cm². At the start of electrolysis a relatively high overpotential for the evolution of hydrogen was noted. After a few hours of operation, this overpotential dropped and, after more than 1400 hours of continuous electrolysis, a cathode overpotential of 258 mV was measured. After correcting for uncompensated resistance losses in the measuring circuit, the overpotential was 70 mV.

EXAMPLES 4 to 7

Hydrogen evolution cathodes were made by pressing mixed $LaNi_{4.7}Al_{0.3}$ (40–70 w/o) and type 123 nickel powders at about $4.22 \times 10^9$ dynes/cm². The electrodes were then sintered under a hydrogen atmosphere for 10 minutes at 900° C. The results of the electrochemical experiments are given below.

| Ex. No. | Mixture | Hrs. of Continuous Electrolysis (200 mA/cm²) | Measured η | Corrected η |
|---|---|---|---|---|
| 4 | 60% Ni 123-40% $LaNi_{4.7}Al_{0.3}$ | 47.0 | 118 mV | 96 mV |
| 5 | 50% Ni 123-50% $LaNi_{4.7}Al_{0.3}$ | 28.5 | 136 mV | 86 mV |
| 6 | 40% Ni 123-60% $LaNi_{4.7}Al_{0.3}$ | 72.0 | 97 mV | 81 mV |
| 7 | 30% Ni 123-70% $LaNi_{4.7}Al_{0.3}$ | 51.0 | 123 mV | 77 mV |

EXAMPLE 8

A hydrogen evolution cathode was made by applying a porous sintered coating of $LaNi_{4.5}Al_{0.5}$ (50%) and Type 123 nickel powders to mild steel screen. After more than 170 hours of continuous electrolysis at 200 mA/cm², a cathode overpotential of 191 mV was measured. Correction for uncompensated resistance losses in the measuring circuit revealed an overpotential of 102 mV.

EXAMPLES 9, 10 and 11

Using procedures described in Example 3, plastic-bonded hydrogen evolution cathodes were made using the following mixture.

| Component | Grade and Particle Size | Wt. % |
|---|---|---|
| Hydridable metal | Ergenics Div. MPD Corp. (−325 mesh) | 86 |
| PTFE | DuPont Teflon TM resin grade 7A (35 μm) | 1 |
| Polyethylene | U.S.I. Chemical FN 500 (20 μm) | 2 |
| Carbon black | Ketjen TM Black | 3 |
| Polyethylene oxide | Union Carbide WSRN TM 750 | 8 |

After 6 hours of continuous electrolysis at 200 mA/cm²

| Ex. No. | Hydridable Metal | Measured Overpotential | Corrected Overpotential |
|---|---|---|---|
| 9 | $LaNi_3Co_2$ | 96 mV | 43 mV |
| 10 | $LaNi_4Cu$ | 130 mV | 46 mV |
| 11 | $CaNi_5$ | 232 mV | 80 mV |

ADDITIONAL EXAMPLES

Hydrogen evolution cathodes were made by mixing various proportions of $LaNi_{4.7}Al_{0.3}$ with nickel 123 powder and incorporating these mixtures into a slurry containing Du Pont Polyox TM polysilicate material as a water dispersible binder. The polysilicate slurries contained, in parts by weight, per 100 parts of total nickel plus $LaNi_{4.7}Al_{0.3}$, the following ingredients:

| | |
|---|---|
| Water | 39.1 |
| Kelzan TM xanthan gum* | 0.35 |
| POLYOX grade P48 | 7.00 |

*Kelvin Division of Merck & Co.

The various slurries were coated onto pieces of screen grossly 4.4 cm² in area on one side. The coating was by dipping and, after coating, interstices of the screen were open. Once coated, the screens were dried and then subjected to sintering. Electrochemical testing of the coated and sintered screens as cathodes resulted in data as set forth below:

| Electrode % $LaNi_{4.7}Al_{0.3}$ | Weight of Coating Metal (g) | Electrolysis Time Hrs. | Overpotential at 200 mA/cm² (uncorrected) mV | Overpotential (mV) Computer Corrected* | | |
|---|---|---|---|---|---|---|
| | | | | 1–200 mA/cm² | 10–200 mA/cm² | 10–600 mA/cm² |
| SINTERING TEMPERATURE (800° C.) | | | | | | |
| 70 | 0.6079 | 23 | 129 | 64 (0.960) | 68 (0.962) | 77 (0.961) |
| 60 | 0.7330 | 23 | 128 | 79 (0.963) | 80 (0.984) | 86 (0.961) |
| 50 | 0.5168 | 23 | 157 | 79 (0.990) | 81 (0.991) | 94 (0.935) |
| 40 | 0.6318 | 71 | 124 | 73 (0.970) | 75 (0.991) | 73 (0.980) |
| 30 | 0.4300 | 23 | 346 | 216 (0.931) | 285 (0.992) | 321 (0.994) |
| SINTERING TEMPERATURE (900° C.) | | | | | | |
| 70 | 0.5028 | 23 | 183 | 74 (0.985) | 73 (0.975) | 80 (0.837) |
| 60 | 0.5675 | 23 | 173 | 78 (0.960) | 80 (0.964) | 89 (0.933) |
| 50 | 0.6359 | 23 | 136 | 70 (0.942) | 74 (0.946) | 87 (0.942) |

-continued

| Electrode % $LaNi_{4.7}Al_{0.3}$ | Weight of Coating Metal (g) | Electrolysis Time Hrs. | Overpotential at 200 mA/cm$^2$ (uncorrected) mV | Overpotential (mV) Computer Corrected* | | |
|---|---|---|---|---|---|---|
| | | | | 1-200 mA/cm$^2$ | 10-200 mA/cm$^2$ | 10-600 mA/cm$^2$ |
| 40 | 0.7033 | 71 | 271 | 116 (0.958) | 134 (0.948) | 207 (0.970) |
| 30 | 0.7305 | 23 | 390 | 366 (0.988) | — | 381 (0.999) |

*Numbers in parenthesis are correlation coefficients.

The drawings show the initial structure of electrodes used in the process of the present invention and the structure of such electrodes (after dehydriding) after various periods of time of use in aqueous alkaline electrolytes. The various "B" versions of the figures show that the electrodes are structurally stable and are characterized by substantial microcracking of the $AB_5$ material.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A process for the electrolysis of water at low cathodic overpotential and at commercial significant rates comprising continuously electrolytically generating at and recovering hydrogen gas from the interface of an aqueous alkaline solution held at a temperature in excess of 60° C. and a cathode, said electrolytical generation of hydrogen occurring at a low overpotential subsequent to an initial break-in period of high over-potential compared to said low overpotential, said cathode operating at a current density of the order of 200 mA/cm$^2$ and said cathode comprising a hydrogenated specie of a bonded, fine powder material including an $AB_5$ phase wherein (a) A is at least one element selected from the group of calcium and rare earth metals, where (b) B is at least one element selected from the group consisting of nickel and cobalt, wherein (c) one or more elements from the group of zirconium and thorium in total can be substituted atom-for-atom for up to about 0.2 atom of A and wherein (d) one or more elements selected from the group consisting of copper, aluminum, tin, iron and chromium in total can be substituted atom-for-atom for up to about 1.5 atoms of B.

2. A process as in claim 1 wherein said B component of said $AB_5$ phase is nickel.

3. A process as in claim 1 wherein said A component of said $AB_5$ phase is at least one rare earth metal.

4. A process as in claim 1 wherein said B component of said $AB_5$ phase is nickel and up to about 1.5 atoms of B are replaced in total and on an atom-for-atom basis by an element from the group consisting of copper and aluminum.

5. A process as in claim 1 wherein said fine powdered material including an $AB_5$ phase is bonded in a sintered metallic structure.

6. A process as in claim 5 wherein said sintered metallic structure is a coating on a metallic current distributor.

7. A process as in claim 1 wherein said material containing an $AB_5$ phase is a plastic bonded structure containing an electroconductive material other than said $AB_5$ phase.

8. A process as in claim 7 wherein said electroconductive material is an electroconductive carbon black.

9. A process as in claim 8 in which said plastic bonded structure containing said $AB_5$ phase and said carbon black is in electronically conductive contact with a metallic current distributor.

10. A process as in claim 1 in which said $AB_5$ phase is essentially a $LaNi_5$ phase.

11. A process as in claim 10 in which said essentially $LaNi_5$ phase is metallurgically bonded to a porous nickel matrix and a metallic current distributor.

12. A process as in claim 1 in which said $AB_5$ phase is essentially a rare earth $Ni_5$ phase.

13. A process as in claim 1 in which said $AB_5$ phase is essentially a $CaNi_5$ phase.

14. A process as in claim 1 wherein said aqueous alkaline solution is maintained at at least about 60° C.

15. A process as in claim 1 wherein the cathode current density based upon the gross dimensions of said cathode is at least about 100 mA/cm$^2$.

* * * * *